United States Patent [19]

Leay

[11] 4,301,599
[45] Nov. 24, 1981

[54] LENS PREVIEWER

[75] Inventor: John Leay, New York, N.Y.

[73] Assignee: Imero Fiorentino Associates, Inc., New York, N.Y.

[21] Appl. No.: 82,064

[22] Filed: Oct. 5, 1979

[51] Int. Cl.³ .............................................. G01C 3/00
[52] U.S. Cl. .................................................... 33/277
[58] Field of Search ............ 33/1 BB, 17, 4 R, 174 A, 33/276, 277, DIG. 9

[56] References Cited

U.S. PATENT DOCUMENTS

| 665,615 | 1/1901 | Mellen | 33/277 |
| 685,839 | 11/1901 | Heger | 33/277 |
| 940,504 | 11/1909 | Brayton | 33/277 X |
| 2,702,944 | 3/1955 | Lane et al. | 33/DIG. 9 |

FOREIGN PATENT DOCUMENTS

| 233961 | 4/1911 | Fed. Rep. of Germany | 33/277 |
| 171054 | 10/1934 | Switzerland | 33/277 |
| 664790 | 1/1952 | United Kingdom | 33/277 |
| 171054 | 10/1934 | Switzerland | 33/277 |

Primary Examiner—Harry N. Haroian
Attorney, Agent, or Firm—Hopgood, Calimafde, Kalil, Blaustein & Judlowe

[57] ABSTRACT

A device is provided for previewing the field of view of an optical lens, for use in still, motion picture or video photography. The device includes a fixed member having an aperture therein and a movable member. The movable member adjusts the size of the aperture in the fixed member. The device further includes a spacer for spacing the user's eye away from the aperture. The fixed member includes a series of openings and the movable member carries indicia which are selectively viewable through said openings, depending on the position of the movable member. The indicia then exposed indicate the focal length of the appropriate lens to be used in order to cover the field of view represented by the selected aperture.

6 Claims, 3 Drawing Figures

LENS PREVIEWER

BACKGROUND AND SUMMARY OF THE INVENTION

This invention relates generally to a device for previewing the field of view of an optical lens for use in still, motion picture or video photography. In such applications it is frequently necessary to be able to estimate the focal length of the lens required from a number of different camera positions. This estimation in many instances must be made without the use of the camera or the lens itself, since these are usually unavailable at the time of estimation. In these situations, a device other than the lenses themselves must be used to be able to estimate the types, sizes and number of lenses required.

Devices for previewing the focal length of lenses have been known in the art. However, such devices generally utilize optical elements to preview the field of view of the lens. Clearly, devices using optical elements are in themselves, expensive, bulky and relatively difficult to use. The present invention is directed to overcoming these difficulties.

Generally speaking, in accordance with the invention, a device for previewing the field of view of optical lenses is provided. The device utilizes an adjustable aperture corresponding in dimension to the aspect ratio of the image formed by the lens. A spacing member spaces the user's eye away from the aperture to simulate the field of view of the lens as seen through the field of view of the aperture. As the aperture is adjusted, the device reads out the proper focal length of the lens to be used with the various film and video formats.

Accordingly, it is an object of this invention to provide an improved device for previewing the field of view of optical lenses.

It is another object of this invention to provide a previewing device that does not require the use of optical elements.

It is another object of this invention to provide a previewing device that is compact and easy to use.

It is another object of this invention to provide a previewing device that is relatively inexpensive to manufacture and use.

Still other objects of this invention will become apparent upon a reading of the detailed specification to follow.

BRIEF DESCRIPTION OF THE DRAWINGS

For a better understanding of the invention, reference is made to the following drawings, taken in connection with the detailed specification to follow.

DESCRIPTION OF THE PREFERRED EMBODIMENTS

Figure 1:
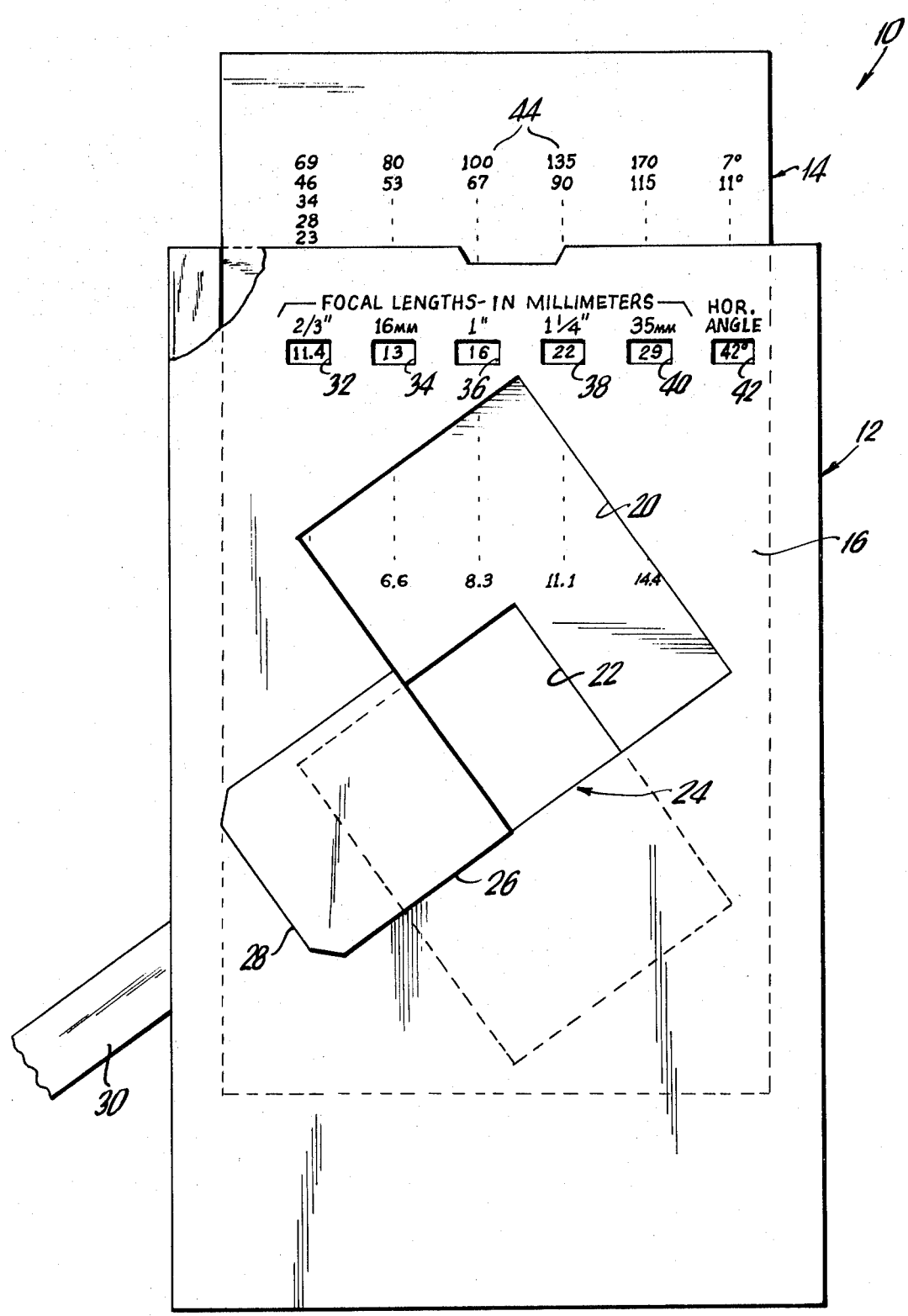
FIG. 1 is a plan view of the first side of the device for previewing the field of view of optical lenses constructed in accordance with the instant invention.
Figure 2:
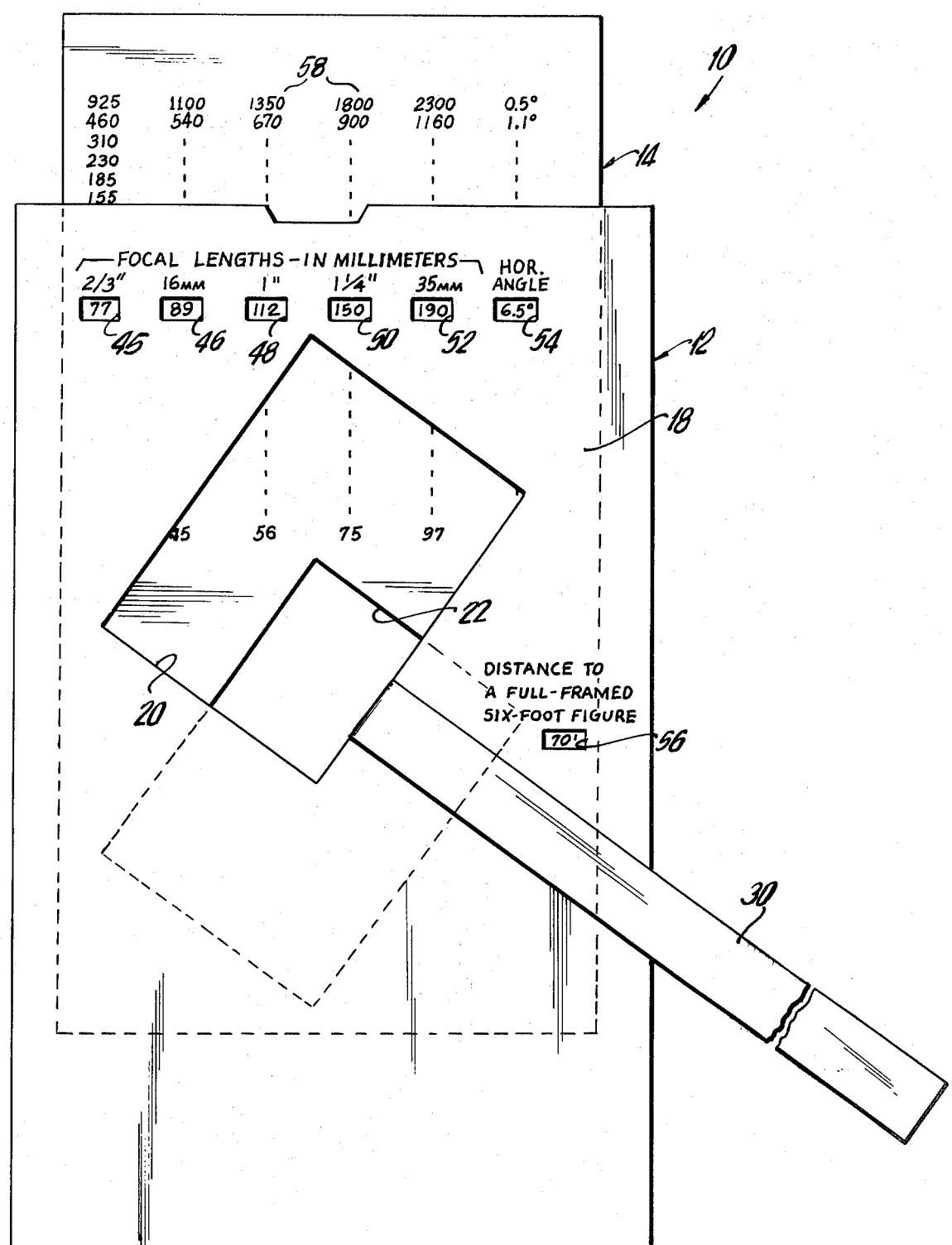
FIG. 2 is a plan view of the other side of the device.
Figure 3:
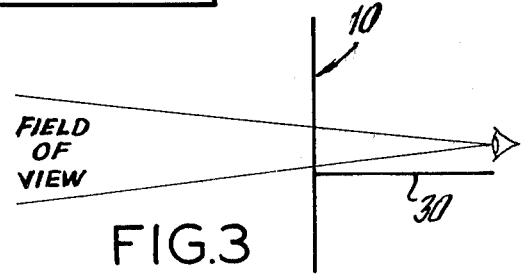
FIG. 3 is an illustration of the use of the device.

The drawings illustrate a device for previewing the field of view of an optical lens for use with a film or video camera. Device 10 includes a fixed part 12 which slidably receives movable part 14. Fixed part 12 includes a first surface 16 on one side of movable part 14 and a second surface 18 on the other. An aperture 20, which extends through both surfaces 16 and 18, is rectangular and has the same aspect ratio (that is, the ratio of its length to its width) as that of the image formed at the plane of the film or video tube. Aperture 20 is orientated with respect to parts 12 and 14 so that its diagonal is parallel to the axis upon which movable part 14 slides.

Part 14 also includes an aperture 22 identical in size and orientation with that of aperture 20. Thus, as member 14 is displaced with respect to member 12, a viewing window 24, whose size is adjustable, is formed in device 10. Hingedly mounted to a side of aperture 20 on surface 16 is a spacer 26 which in use will be extended at right angles to surface 16. The user will then place his eye against the outer edge 28 of spacer 26 to look through window 24. As part 14 is moved, the size of window 24 will change, and accordingly, so will the field of view seen by the user.

A second spacer 30 is mounted to the other side of window 24 on surface 18. Spacer 30 is considerably longer than spacer 26 and is preferably constructed from a flexible tape or string. However, its use is identical to that of spacer 26, i.e. the user utilizes spacer 30 to space his eye a distance away from window 24. The shorter space 26 is utilized for previewing the field of view of wide angle lenses, since its field of view through window 26 is wider. Spacer 30 is utilized to preview telephoto lenses, since its longer length provides a narrower field of view through window 24.

Surface 16 includes a series of small openings 32 through 42 which permit the user to see various printed indicia 44 carried by movable part 14. Different indicia are exposed to view as part 14 is moved and the size of aperture 22 is adjusted. Openings 32 through 40 are marked with the sizes of various video camera tubes or film formats. An example of such would be the labeling of openings 32 through 40, as ⅔ of an inch, 16 millimeters, 1 inch, 1¼ inch and 35 millimeters, respectively, the inch designations are the size of various commonly used tubes in television cameras and the millimeter sizes refer to the film formats. The numbers appearing in openings 32 through 40 provide the required focal length in millimeters of the lens to provide the field of view seen through aperture 22. Additionally, opening 42 could display in degrees, the horizontal angle of the field of view.

Surface 18 contains openings 42 through 52 corresponding to the format sizes previously stated with respect to openings 32 through 40; opening 54 would indicate the horizontal angle seen with the use of window 24 and spacer 30. Since spacer 30 and window 24 provide a narrower field of view, the numbers shown in openings 44 through 56 would be larger than those seen in openings 32 through 40. An opening 56 is used to indicate the distance away to a six foot figure extending across the shorter side of window 24, enabling the device to be used to estimate the distance the user is to a person of average height.

It is clear that openings 32 through 56 may be located at any suitable place on surfaces 16 and 18. Device 10 may be constructed from any suitable material ranging from cardboard or plastic to metal, depending upon the degree of durability required. It is apparent that the instant invention provides an easy and economical way to estimate the focal lengths required in movie or television production situations. Furthermore, this invention eliminates the need for costly and bulky viewers utilizing optical systems.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What is claimed is:

1. A device for previewing the field of view of an optical lens comprising:
   (a) an opaque member having a rectangular aperture therein;
   (b) means for adjusting the size of said aperture, including a second opaque member having a rectangular aperture therein, said second opaque member being slidably displaceable with respect to said first opaque member, the diagonal of said first and second rectangular apertures being oriented along a common line to thereby adjust the size of the aperture formed by said first and second apertures;
   (c) means for spacing the eye of the user a predetermined distance away from said aperture; and
   (d) indicia means disposed on said second opaque member, said first opaque member having means to indicate the appropriate portion of said indicia means for the user to thereby display the focal length of the lens providing a field of view corresponding to the field of view seen through said aperture.

2. The device as claimed in claim 1, wherein said aperture in a rectangle having the same aspect ratio as the image to be formed by said lens.

3. The device as claimed in claim 1, further including second means for spacing said eye of said user a second predetermined distance away from said aperture.

4. The device as claimed in claim 1, wherein said opaque member is a planar member.

5. The device as claimed in claim 1, further including second indicia means for displaying the focal length of a second lens.

6. The device as claimed in claim 1, wherein said means to indicate comprise an opening in said first opaque member through which said indicia moves may be seen.

* * * * *